US006897874B1

(12) United States Patent
Riach

(10) Patent No.: US 6,897,874 B1
(45) Date of Patent: May 24, 2005

(54) METHOD AND APPARATUS FOR PROVIDING OVERLAY IMAGES

(75) Inventor: Duncan Riach, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 09/540,335

(22) Filed: Mar. 31, 2000

(51) Int. Cl.[7] ........................... G06F 13/00; G09G 5/36

(52) U.S. Cl. ........................................ 345/558; 345/538

(58) Field of Search ................................ 345/660, 547, 345/536, 545, 558, 560, 533, 629, 532, 336, 538, 58

(56) References Cited

U.S. PATENT DOCUMENTS 5,469,223 A * 11/1995 Kimura ...................... 348/581
5,671,445 A * 9/1997 Gluyas et al. ................ 710/53
5,694,571 A * 12/1997 Fuller ......................... 711/113
5,764,201 A * 6/1998 Ranganathan .................. 345/3
5,767,863 A * 6/1998 Kimura ...................... 345/507
5,864,512 A * 1/1999 Buckelew et al. ..... 365/230.01
5,877,741 A * 3/1999 Chee et al. ................. 345/629
5,894,312 A * 4/1999 Ishiwata et al. ............ 345/504
5,914,711 A * 6/1999 Mangerson et al. ........ 345/203
5,931,922 A * 8/1999 Hough ........................ 710/34
5,953,020 A * 9/1999 Wang et al. ................ 345/558
5,978,841 A * 11/1999 Berger ........................ 709/217
6,166,748 A * 12/2000 Van Hook et al. .......... 345/522
6,233,629 B1 * 5/2001 Castellano .................. 710/29
6,348,925 B1 * 2/2002 Potu ........................... 345/537
6,348,929 B1 * 2/2002 Acharya et al. ............ 345/660
6,415,377 B1 * 7/2002 Van Der Wolf et al. .... 712/207

* cited by examiner

*Primary Examiner*—Mark Zimmerman
*Assistant Examiner*—Scott Wallace
(74) *Attorney, Agent, or Firm*—Townsend and Townsend and Crew LLP

(57) ABSTRACT

A circuit for providing an overlay in a window on a computer output display including scaling circuitry, storage circuitry for receiving a plurality of lines of source data, input circuitry for loading the storage circuitry in a first prefill mode and in a second low water mark mode, and circuitry for selecting a mode for loading the storage circuitry responsive to the characteristics of the demand for data placed on the storage circuitry.

29 Claims, 2 Drawing Sheets

PRIOR ART

METHOD AND APPARATUS FOR PROVIDING OVERLAY IMAGES

BACKGROUND OF THE INVENTION

1. Field of the Invention

This invention relates to computer systems, and more particularly, to methods and apparatus for providing window overlays on an output display.

2. History of the Prior Art

For some time there has been a need to provide a window on a computer output display in which information from a source other than a computer program may be displayed. For example, it is desirable to display video information provided by a source of television signals or from a digital video disk (DVD) in a window on a computer display.

To accomplish this, the prior art initially combined video signals which had been transformed into RGB format with computer graphic information in the frame buffer. Such an approach provides a window in which video images may be displayed; however, any manipulation of the video data can only be accomplished by the time consuming process of accessing and then returning the manipulated data to the frame buffer.

As the amount of video and graphics data being displayed have both increased, the need to access video data in the frame buffer has greatly slowed the display processes. For this reason, the most recent attempts to display video have concentrated on providing what is referred to as a hardware overlay that displays video information separately from the computer graphics information. The two channels of information are ultimately combined beyond the frame buffer at the end of the graphics pipeline just prior to display.

This method of displaying video information in a window on a computer graphics display performs satisfactorily so long as the manipulation of the video information is limited to color space conversion from a video format to a red/green/blue (RGB) computer graphics format and the video image is either enlarged or maintained at the size provided by the video source. However, if the video image is to be reduced from the size of the source, the data transfer rate during window scanout becomes too great for prior art overlay engines to handle.

It is desirable to provide an improved method and circuitry for furnishing video information in a window on a computer output display.

SUMMARY OF THE INVENTION

It is, therefore, an object of the present invention to provide improved circuitry and a method for furnishing video information in a window on a computer output display.

These and other objects of the present invention are realized by a circuit for providing an overlay in a window on a computer output display including scaling circuitry, storage circuitry for receiving a plurality of lines of source data, input circuitry for loading the storage circuitry in a first prefill mode and in a second low water mark mode, and circuitry for selecting a mode responsive to the characteristics of the demand for data being placed on the storage circuitry.

These and other objects and features of the invention will be better understood by reference to the detailed description which follows taken together with the drawings in which like elements are referred to by like designations throughout the several views.

DETAILED DESCRIPTION

Figure 1:
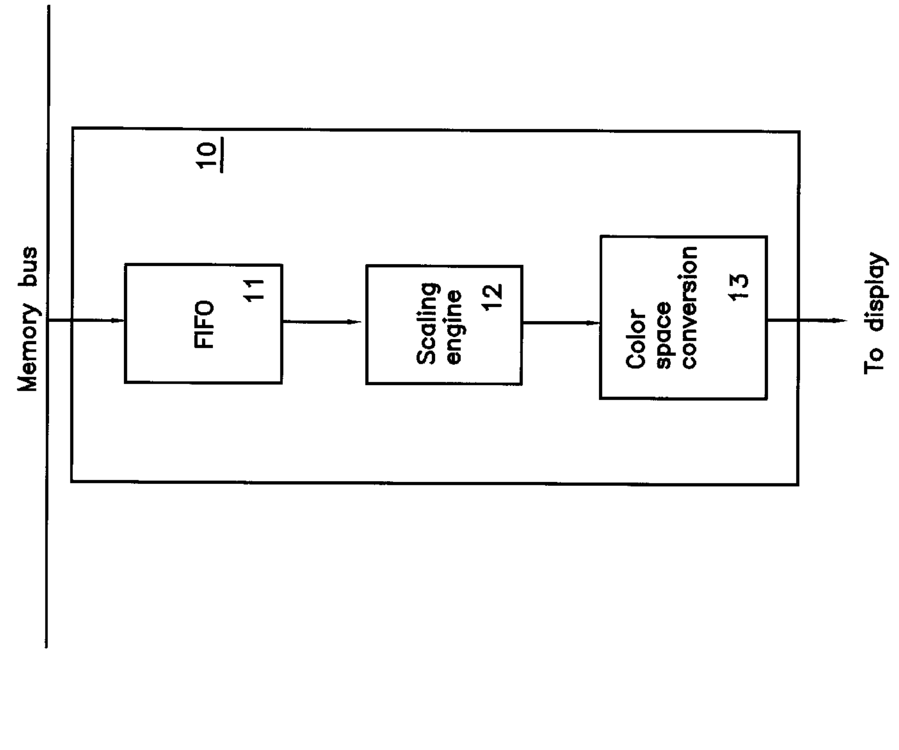
FIG. 1 is block diagram illustrating an overlay engine utilized by the prior art.

FIG. 1 is a block diagram illustrating a circuit 10 for providing a video overlay designed in accordance with the prior art. The circuit 10 includes a FIFO 11 which receives video data from a source of video data (not shown) such as a buffer in off-screen memory. Video information is transferred to a scaling engine 12 at a rate to match the pixel clock of the computer graphics system. The scaling engine 12 is utilized to increase the size of the image provided by the video source where that is a requirement of the application. The output of the scaling engine 12 is provided to a color space conversion unit 13 which changes the color format from the typical NTSC or PAL television format which is furnished by the video source to a red/green/blue (RGB) format for presentation on a computer output display. The resulting video information is transferred to the proper window position of the output display via mixing circuitry (not shown).

In known overlay engines of the prior art, the scaling engine is capable of enlarging the video image or simply passing it through without change to the color space conversion circuitry. When the video data is passed through without change by the scaling engine, the FIFO 11 must furnish data at the same rate as the pixel clock used for clocking graphic data to the output display since each pixel of the video data appearing in a window on the display must be clocked to the screen at the same rate as the graphics data.

The overlay engine 10 is able to accomplish this by a process in which it commences to fill the FIFO 11 with video data beginning at the start of the horizontal blanking period for a scan line and ending when the FIFO has filled to some preselected level. Typically, the FIFO 11 is small compared to a scan line of video data so it fills to the selected level before the beginning of the video window on the scan line. When the video window begins, the video data is drawn from the FIFO and provided to the scaling engine. With no enlargement of the video data, the data is drawn out at the pixel clock rate for graphics data. Requests are sent by the FIFO for more data when data in the FIFO reaches a "low water mark." The low water mark is set at a level at which the FIFO will have received sufficient data to prevent the FIFO from emptying before new data is returned. If the amount of source line data left is less than the amount that would normally be requested to cover the latency, then the smaller amount of data will be requested.

When the video image is enlarged, a lower data rate is required from the FIFO during the scanout of the window. This is true because the same number of pixels are expanded into a larger number of pixels according to some algorithmic process such as linear interpolation. As is known, typical algorithms for enlarging a scan line horizontally utilize values of adjacent pixels to generate additional pixels between those provided by the source. Vertical enlargement algorithms utilize the pixels of a plurality of usually sequential scan lines to generate scan lines in addition to those furnished by the source. To this end, scan line storage is usually provided in the scaling engine so that vertical filtering may be accomplished to generate new scan lines in enlarging video data. Because a lower pixel rate is required during the scanout of the window when enlarging the video image, the FIFO 11 is able to furnish video data to the scaling engine 12 at a rate less than the pixel clock rate of the graphics data.

A prior art overlay engine 10 is not capable of providing video data at a rate sufficient to allow a significant reduction in size of the video image which is to be displayed. This is true because the pixel rate required by a scaling algorithm during scanout of the window from the source of pixels to reduce the size of the video image is much greater than is required for a direct display or an enlargement of the video image. Thus, to produce a window image which is reduced in size, the rate of pixel data furnished by the source of video data, during scanout of the window, is much greater than required for either an unenlarged or an enlarged image. For example, to reduce the width of the video image by half, all of the pixels for a full size image are required to be manipulated by the scaling engine to generate half as many pixels as an output. However, the output furnished by the scaling engine must still be at the pixel clock rate required for display on the computer output screen. This requires that the FIFO (and the source) furnish the same amount of video data in half the time. The need for a much larger amount of video data also results from the reduction in image size in the vertical direction.

The data rate demanded from the FIFOs during the scanout of the window is simply too high to be provided by the schemes of the prior art. Moreover, the concentration of this data transfer over the graphics engine memory bus severely restricts the flow of other (graphics) data. Consequently, prior art circuitry has been unable to accomplish any significant reduction in video image size.

Even though prior art circuitry has been unable to reduce the size of video data presented in a window on a computer output display, it is desirable to be able to do so.

As has been described, prior art circuits for placing a video display on the output display of a computer have allowed the video information to be displayed at the same size as received or enlarged. Prior art circuitry has not provided for reducing the video data when displayed on a computer output display. The reason reducing has not been practiced is that it requires a significantly higher data rate from the FIFOs, during the scanout of the window, to generate a reduced image than to generate an image in the size received from the source. For example, if an image is to be placed in an area one-quarter the size of that for which it is intended by reducing its width and height each to one-half of the original, then the pixels of each scan line of pixel data must be reduced to one-half and the number of scan lines must be reduced to one-half. To reduce the number of pixels in a scan line to one-half typically requires interpolating the values of two adjacent pixels to produce a single pixel. This requires that the scaling engine of the pipeline that accomplishes the reduction manipulate twice as many pixels for a given length of a scan line in which the video window is to appear than would be handled for a one-to-one video window generation process. Moreover, to reduce the number of scan lines to one-half those of a full size video display, two or more scan lines are interpolated to combine their colors in a well known manner to provide one resulting line which replaces each two original scan lines. Thus, twice as many lines of pixel data must be manipulated by the scaling engine than would be handled for a one-to-one video window generation process. In all, four times as much pixel data is required within the time available for drawing the video window as would be needed for a one-to-one video window generation process.

The most recent versions of Microsoft Windows require that the video data placed in off-screen buffer areas and merged with graphics pixel data be capable of reduction by a factor of eight in each dimension. The rate of video data required during window scanout to accomplish an eight times reduction in the video image is much larger than the memory bus is capable of furnishing in real time. For this reason, the prior art has found it impossible to meet the requirements of the Windows system software.

Figure 2:
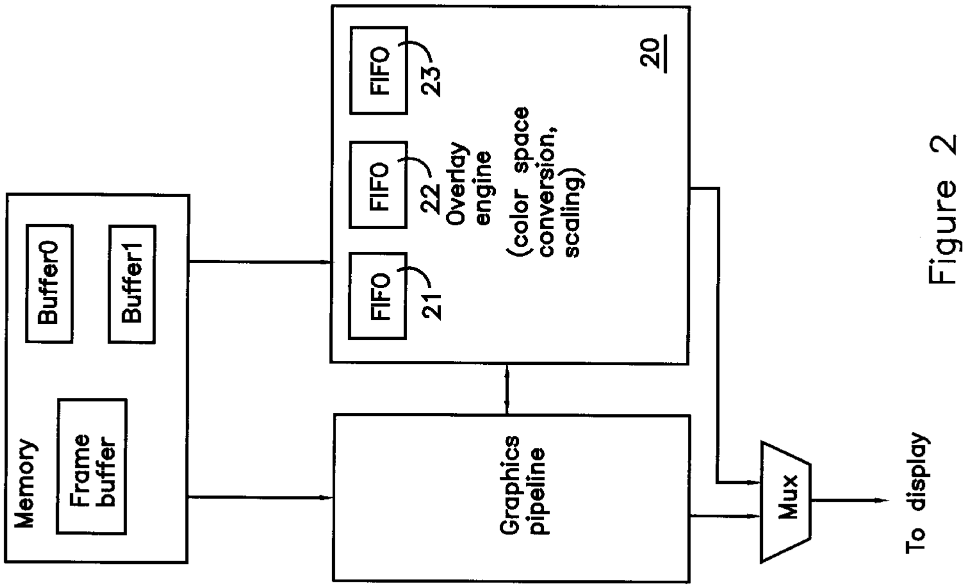
FIG. 2 is a block diagram illustrating an arrangement in accordance with the present invention.

The present invention overcomes these limitations by significantly modifying the manner in which video data is handled. FIG. 2 is a block diagram illustrating an overlay engine 20 in accordance with the general principles of the present invention. Rather than utilizing a single FIFO for furnishing the video data to the pipeline, the circuit 20 utilizes three individual first-in first-out (FIFO) circuits 21–23 to receive video data stored in off-screen buffer areas. Moreover, rather than utilizing smaller FIFOs capable of storing only sufficient data to cover a single memory request, each FIFO 21–23 is designed to have sufficient capacity to store at least one scan line of video data for a source image up to a certain width. By using three large FIFOs instead of a single small FIFO as in prior art arrangements, the present invention is able to provide three individual scan lines of data. The three scan lines available may be utilized to accomplish three scan line vertical filtering which generates a single resulting scan line. In this manner, sufficient video data is available to generate an entire scan line of video data.

The three FIFOs 21–23 are connected to furnish video data to a video pipeline of the overlay engine 20. The pipeline receives the video data in appropriate order and processes that data through scaling and color space conversion stages. Video data is sent to the scaling stage of the pipeline where the image is enlarged, reduced, or kept at the same size in response to instructions furnished by a controlling process. The image in what is typically a television or DVD format which results from the scaling process is sent to the color space conversion stage which transforms the data into the RGB format used for display on a computer output display utilizing a color space conversion algorithm well known to those skilled in the prior art.

In accordance with the present invention and in contrast to prior art overlay engines, the engine 20 controls the transfer of data to each FIFO 21–23 to commence, in most cases, sufficiently early that each of the three FIFOs is prefilled before any of the data needed for processing a scan line of video data is required. For example, in one embodiment the overlay engine 20 begins to fill the individual FIFOs at the start of the horizontal blanking period which commences one full scan line before the first scan line in which the video window in displayed in the manner shown in FIG. 3. Assuming that the video window is sufficiently narrow compared with the width of the screen and assuming a system in which two scan lines of video data may be accessed at once, this allows the FIFOs 21–23 to be filled before the data is required by the scaling engine. Filling the FIFOs which are each sufficient to hold a complete scan line of unscaled source image data before the scan line within the video window is begun eliminates the problem of having insufficient bandwidth to keep up with the scanning process while downscaling the video image.

Figure 3:
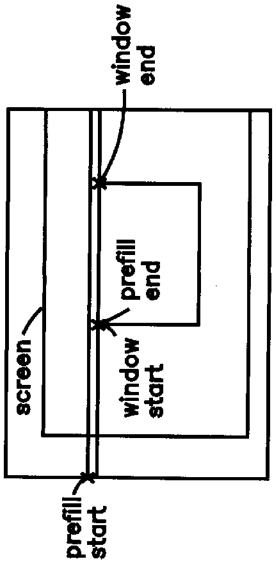
FIG. 3 is a diagram illustrating a computer output display.

In a scaling engine which uses three source image lines to generate a single output scan line and in which the video image size is reduced vertically not more than two times, it is possible to prefill the FIFOs with the necessary video data to maintain the correct pixel clock rate. This is accomplished by starting the prefill process as soon as the video window ends and continuing until the next scan line reaches the beginning of the video window. FIG. 3 illustrates the position at the end of the first scan line of the video window at which the prefill for the next scan line begins. Thus, the FIFOs have a period from the end of the window through the horizontal blanking period of the next scan line up to the point at which the video window recommences. As will be recognized by those skilled in the art, the typical three scan line vertical scaling algorithm can utilize one or more of the three lines used for generating a completed scan line and zero, one or two new lines to generate a next scan line (for vertical downscale of less than or equal to two times). The engine 20 knows the lines which are required and requests the appropriate video data from memory to provide the new scan lines. Since one FIFO will already contain the video information for al least one of the three scan lines, it is only necessary that at most, two of the three FIFOs 21–23 be refilled from the time one scan line in the video window is reached until the next begins (for up to two times vertical downscaling). In one embodiment, the first scan line of the video window is generated using only two source image lines one of which is duplicated to provide the third set of values. Thus, only two scan lines of video data are required for generating the initial scan line within the video window.

In cases where more video data is required than can be provided during the period allotted for prefilling, the overlay engine 20 switches to a low water mark monitoring (demand) mode in which it continues to fill the FIFOs whenever the video data remaining in any FIFO drops below a programmable level (a low water mark). The low water mark mode commences in one embodiment when all of the data requested for a FIFO have not been furnished and a video window scan line commences. The engine 20 switches to this operating state so that it requests and receives more video data as the data is drained from a FIFO down to the low water mark. When the end of the video window scan line is reached, the prefill condition begins again so that as much data as possible is placed in the FIFOs before the next scan line of the video image begins.

Figure 4:
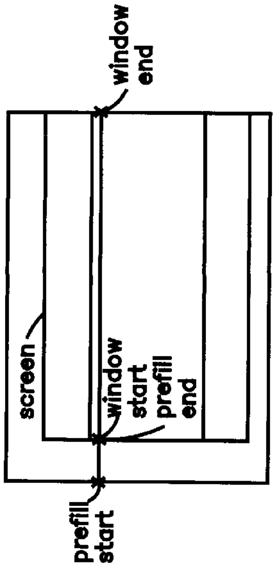
FIG. 4 is another diagram illustrating a computer output display.

Switching between modes for filling the FIFOs is especially useful in a case in which a video window is as wide as the entire display (see FIG. 4). As may be seen, the time allotted from the end of the window until the window recommences is quite short compared to that allotted for the window shown in FIG. 3 even when the size of the video image is not being reduced. Consequently, the low water mark mode allows the engine to continue to fill the FIFOs in this and other instances when they have not received all of the data requested.

In one embodiment, the scaling engine is adapted to switch from three scan line vertical filtering to two line vertical filtering in situations in which there is a vertical reduction in the video image of more than two or when the source image is too wide to store completely in the FIFOs. Switching to two line vertical filtering when vertical down scaling is greater than two is chosen because the embodiment is only capable of reading into two FIFOs at once while vertical down scaling of greater than two, while doing three tap vertical filtering, requires more than two new source image lines for each output scan line. If the source image is too wide for a line of it to be stored in a FIFO, then a previously read line cannot be re-used to generate the current output line (It is not stored in a FIFO). This means that two input lines must be read fresh from memory to generate every output line resulting in only two tap vertical filtering being carried out. Of course, if more FIFOs and circuitry for loading such FIFOs in parallel are available in a particular embodiment, then some greater plurality (than three taps) of vertical filtering may be utilized initially and reduced to a lesser plurality of taps for vertical filtering, equal to the number of lines which can be read in parallel, when there is a vertical reduction in the video image of some predetermined amount, or when the source image is too wide to store completely in the FIFOs, or some similar situation occurs.

Figure 5:
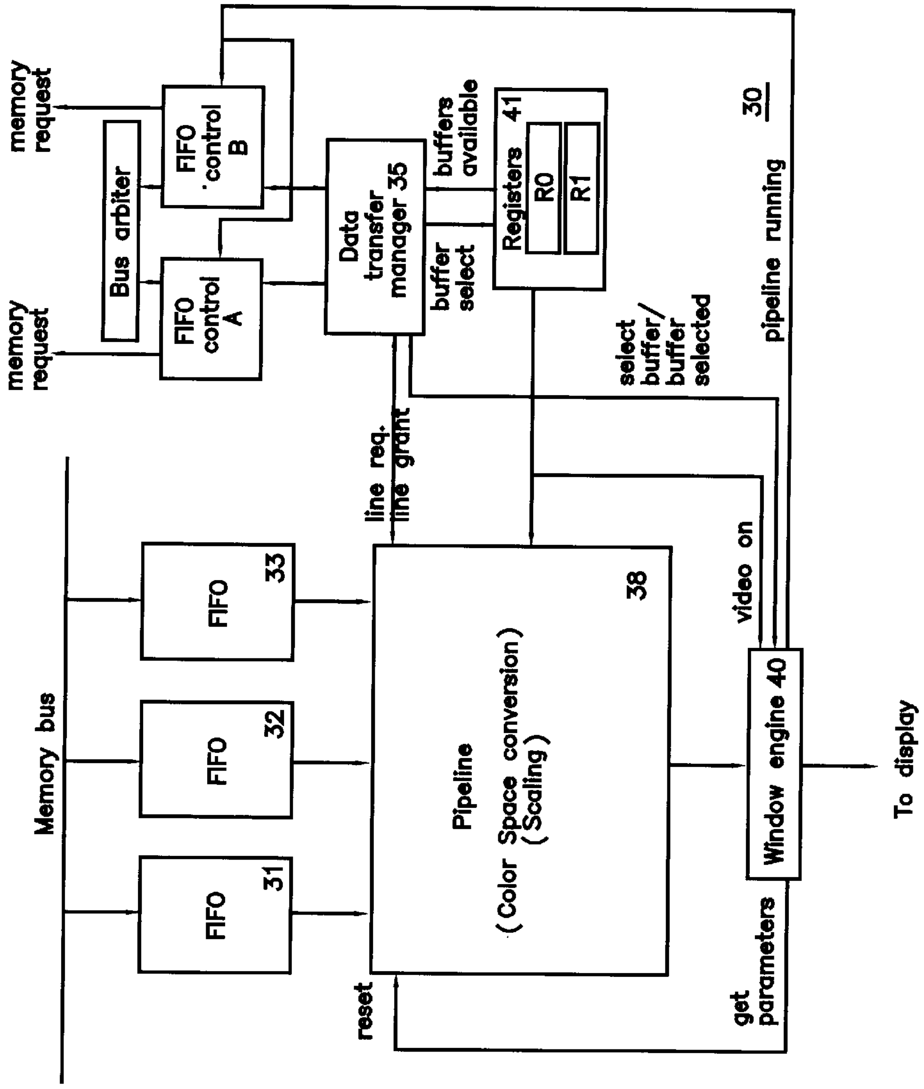
FIG. 5 is a block diagram illustrating one embodiment of circuitry for carrying out the present invention.

FIG. 5 is a block diagram illustrating one embodiment of a circuit 30 designed in accordance with the present invention. The circuit 30 includes three individual first-in first-out (FIFO) circuits 31–33 for storing data for generating video images to be displayed in windows on a computer output display. The term FIFO is used to refer to the storage unit that makes up part of the complete FIFO functionality. In one embodiment of the invention, each FIFO is designed to have sufficient capacity to store at least one source line of video data. It should be noted that because the FIFOs hold an entire scan line of video data, the storage required by prior art overlay engines in the scaling engine may be completely eliminated since all three lines of scan line data necessary are available without scaling engine storage. The three FIFOs 31–33 are connected to furnish video data under control of a data transfer manager 35 to a video pipeline 38. The pipeline 38 arranges the source pixel data in appropriate order for processing through scaling and color space conversion stages of the video pipeline 38. The scaling stage of the pipeline 38 receives source pixel data and enlarges, reduces, or maintains the size of the source image in response to instructions furnished by a controlling process. The scaled data which results is sent to the color space conversion stage which receives source pixel data in a typical video format used for television or DVD display and transforms it into the RGB format used for display on a computer output display utilizing a color space conversion algorithm well known to those skilled in the prior art.

A window engine 40 cooperates with the data transfer manager 35 in the operation of the overlay engine 30. The window engine keeps track of screen position and window placement to assure that the data is correctly manipulated and placed in the video window.

Ultimately, the pixel information in RGB format which results from the pipeline 38 is transferred to a multiplexor (see FIG. 2) where it is combined with the pipeline of graphics information being transferred from a frame buffer (FIG. 2) for display on an output display.

In order to accomplish the transfer of video data in accordance with the present invention, the data transfer manager 35 utilizes a FIFO control circuit A, a FIFO control circuit B, and a register array 41 including registers R0 and R1.

The engine 30 functions in the following manner. Software controlling the display of a video window on the output display writes the parameters controlling the video window and the video data to be displayed to a buffer such as the buffer0 illustrated in FIG. 2. These parameters include among other things the window position and size and the scaling factor to be used. The parameters controlling where the data is to appear are also written by the software to one of the two registers R0 or R1 in register file 41. The window engine 40 keeps track of the lines being scanned to the screen and just before the end of the vertical blanking period signals the data transfer manager that the screen is about to start. The data transfer manager recognizes the screen start signal and reads the parameters in the register file 41 so that it knows which buffer in memory contains video data to be placed in the window in order to select a buffer. The data transfer manager selects the buffer designated by the parameters in the register file 41 (register R0 or R1).

When it has selected a buffer, the data transfer manager signals the window engine 40 that the particular buffer has been selected. The window engine 40 directs the pipeline 38 to obtain the parameters from the appropriate register of the register file 41 and itself reads the parameters to determine where the window is to appear on the display.

The window engine counts the lines being sent to the display until the scan line before the first scan line including the video window is reached. When the window engine has counted to the scan line which is one line before the video window is to begin, the window engine 40 resets the pipeline at the beginning of the horizontal blank for this line. This resets the vertical and horizontal scaling algorithms and directs the pipeline to fetch the first scan lines from the FIFOs. The reset also causes the pipeline to unstall.

The pipeline, which knows how many new lines it needs, generates a line request to the data transfer manager which keeps track of the particular scan lines needed for executing the vertical scaling algorithm. Once there is enough data in the FIFOs to fill the pipeline, the data transfer manager grants the request and instructs the pipeline which lines to access and in which FIFO a particular source line exists. The pipeline then passes the data down through its stages until the data arrives at the window engine. The window engine then stalls the pipeline.

The data transfer manager also keeps track of the scan lines in the FIFOs. The data transfer manager uses the FIFO control circuits A and B to fetch video data from the selected memory buffer and to place the data in the one or two of the FIFOs chosen to hold the new scan lines of data while maintaining data already in the other FIFOs to be reused in the vertical scaling calculation. The data transfer manager selects a particular FIFO control circuit to access the data and tells the FIFO control circuit which FIFO to place that data in. The data transfer manager is able to select particular lines to meet the needs of the scaling algorithm and the degree of enlargement or reduction.

When the data transfer manager has requested that the FIFO control circuits access particular lines of data from a particular buffer and place those lines in particular FIFOs, it signals the pipeline and indicates which FIFOs the scan lines reside in. The FIFO controllers are programmed to request bursts of data of a preset amount in order not to overload the memory bus. A bus arbiter causes the requests to be granted and the data to be furnished in the corresponding bursts to first one then the other of the FIFOs designated by the FIFO controllers and at a reasonable rate on the memory bus so as not to swamp it. Each of the FIFO controllers knows when it has furnished the correct amount of data to a FIFO for one scan line of the video window so that it will stop when this point is reached.

When the pipeline receives the signal that its request for data has been granted along with the order of the data in the FIFO, it starts draining the FIFOs into the pipeline 38. The window engine 40 will unstall the pipeline 38 until the data reaches the input to the window engine. The window engine will then stall the pipeline and wait for the start of the video window.

At the point at which the video window starts, the windows engine signals the FIFO controllers that the window is running. This signal causes the FIFO controllers to switch to the low water mark mode of operation. In this mode, any FIFO controller presently receiving data in response to a request to the bus arbiter finishes that request and then stops requesting until the low water mark level is reached. If data reaches that level during a scan line and more data is needed to meet the initial request for data, the FIFO controller signals the bus arbiter to furnish data using a low water mark request. The bus arbiter responds to these requests immediately so that the FIFO receives a next burst as soon as possible and the need for data can be met when it is required for a currently displaying window. Again, when the FIFO has received the entire amount of data requested initially, it stops filling.

In the meantime, the windows engine continues to check the position on the screen. When the end of a scan line within the video window is reached (see FIG. 3), the window engine resets the pipeline, causing the pipeline to request a new scan line from the data transfer manager. This in turn, causes the data transfer manager to initiate another transfer of data from the selected buffer to the FIFOs in prefill mode. This process continues until, ultimately, the buffer selected will have been scanned out and the window completed on the display. When this occurs, the next frame of the display may be filled from another buffer (buffer1) in off-screen memory thereby providing completely tear-free double buffering for the video window process.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for providing data for an image to a display pipeline, the circuit comprising:

a plurality of storage circuits, each configured to receive source data for a source line of the image and to provide the source data to the display pipeline;

an input circuit configured to control transfers of the source data to the plurality of storage circuits, the input circuit operable in a prefill mode and a demand mode; and a mode selection circuit configured to select one of the prefill mode and the demand mode based at least in part on a characteristic of demand for the source data by the display pipeline.

2. The circuit of claim 1, wherein the mode selection circuit is configured such that:

the prefill mode is selected for transferring source data for a source line corresponding to a current scan line to the storage circuits before processing of the current scan line by the display pipeline begins; and the demand mode is subsequently selected in the event that processing of the current scan line by the display pipeline begins before the storage circuits have received all of the source data for the source line corresponding to the current scan line.

3. The circuit of claim 1, wherein each storage circuit includes a first-in, first-out (FIFO) circuit having a capacity sufficient to store all of the source data for a source line.

4. The circuit of claim 1, further comprising:

a scaling engine configured to generate images having a modified size from the source data, wherein the modified image has a number of scan lines that is different from a number of source lines of the image.

5. The circuit of claim 4, wherein the scaling engine is further configured to perform vertical reduction using a number of source lines that depends on a value of a scaling factor.

6. The circuit of claim 5, wherein the number of source lines is equal to a first number when the value of the scaling factor corresponds to reduction by less than a selected amount and is equal to a second number when the value of the scaling factor corresponds to reduction by more than the selected amount, wherein the second number is less than the first number.

7. The circuit of claim 6, wherein the first number is equal to a number of source lines of source data that can be stored in the storage circuits and the second number is equal to a number of source lines of source data that can be transferred in parallel to the storage circuits.

8. The circuit of claim 4, wherein the scaling engine is further configured to perform vertical reduction using a number of source lines that depends on an amount of source data needed per scan line.

9. The circuit of claim 8, wherein the number of source lines is equal to a first number when the amount of source data needed per scan line is less than a selected amount and is equal to a second number when the amount of source data needed per scan line is more than the selected amount, wherein the second number is less than the first number.

10. The circuit of claim 9, wherein the first number is equal to a number of source lines of source data that can be stored in the storage circuits and the second number is equal to a number of source lines of source data that can be transferred in parallel to the storage circuits.

11. The circuit of claim 1 wherein:

in the prefill mode, transferring of source data for a source line into one of the storage circuits begins irrespective of a level of source data in the storage circuit and ends in the event that all of the source data for the source line is transferred into the storage circuit; and in the demand mode, transferring of source data for a source line into one of the storage circuits begins in the event that the level of source data in the storage circuit reaches a preselected low level and ends in the event that the level of source data in the storage circuit reaches a preselected high level.

12. The circuit of claim 1 wherein the characteristic of demand includes whether the display pipeline is processing a scan line of the image.

13. The circuit of claim 1, further comprising:

a scaling engine configured to generate a scan line of the image from one or more of the source lines of the image, wherein the scaling engine is capable of reducing and enlarging images.

14. The circuit of claim 1 wherein the image is an overlay image.

15. The circuit of claim 1 wherein the input circuit is configured such that source data for different source lines of the image is transferred in parallel to different ones of the plurality of storage circuits.

16. The circuit of claim 15 wherein a number of source lines for which data is transferred in parallel is less than the number of storage circuits.

17. The circuit of claim 1, wherein a data request by the input circuit in the demand mode is granted at a higher priority than a data request by the input circuit in the prefill mode.

18. A method for providing source data for a scan line of an image to be displayed, the method comprising:

in a prefill mode, filling a plurality of storage circuits with source data for a plurality of source lines of the scan line before reading of the source data for the scan line from the storage circuits begins;

reading the source data for at least one of the source lines from the storage circuits; and in the event that the act of reading begins before the storage circuits are filled in the prefill mode with all of the source data for the source lines of the scan line:

switching from the prefill mode to a demand mode:

monitoring a level of unread source data in the storage circuits; and in response to determining that the level of unread source data in the storage circuits is below a preselected low level, filling the storage circuits with additional source data in the demand mode until the level of unread data in the storage circuits reaches a preselected high level or until all of the source data for the source lines of the scan line has been stored in the storage circuits.

19. The method of claim 18, further comprising:

performing vertical filtering on the source data using a number of source lines that depends on a value of a scaling factor indicating a size modification of the image to be displayed.

20. The method of claim 19, wherein the number of source lines is equal to a first number when the value of the scaling factor corresponds to reduction by less than a selected amount and is equal to a second number when the value of the scaling factor corresponds to reduction by more than the selected amount, wherein the second number is less than the first number.

21. The method of claim 20, wherein the first number is equal to a number of source lines of source data that can be stored in the storage circuits and the second number is equal to a number of source lines of source data that can be transferred in parallel to the storage circuits.

22. The method of claim 18, further comprising:

performing vertical filtering on the source data using a number of source lines that depends on an amount of source data needed to generate a scan line of the image.

23. The method of claim 22, wherein the number of source lines is equal to a first number when the amount of source data needed per scan line is less than a selected amount and is equal to a second number when the amount of source data needed per scan line is more than the selected amount, wherein the second number is less than the first number.

24. The method of claim 23, wherein the first number is equal to a number of source lines of source data that can be stored in the storage circuits and the second number is equal to a number of source lines of source data that can be transferred in parallel to the storage circuits.

25. The method of claim 18 wherein each of the storage circuit is a FIFO having sufficient capacity to store all of the source data for one of the source lines.

26. The method of claim 18, further comprising:

generating a scan line of a reduced-size image from source data for at least two source lines read from the storage circuits.

27. The method of claim 18, wherein filling the storage circuits in the demand mode is performed at a higher priority than filling the storage circuits in the prefill mode.

28. The method of claim 18, further comprising switching from the demand mode to the prefill mode after all of the source data for the scan line has been read from the storage circuits.

29. A circuit for displaying a pixel, the circuit comprising:

a graphics engine for providing graphics pixel data;

an overlay engine for providing overlay pixel data for an overlay image, the overlay engine including:

a plurality of storage circuits, each configured to receive source data for a source line of the overlay image and to provide the source data to the display pipeline;

an input circuit configured to control transfers of the source data to the plurality of storage circuits, the input circuit operable in a prefill mode and a demand mode;

a mode selection circuit configured to select one of the prefill mode and the demand mode based at least in part on a demand for the source data by the display pipeline; and a scaling engine configured to generate a scan line of the overlay image from one or more of the source lines of the overlay image and capable of reducing and enlarging the overlay image; and selection circuitry configured to select between the graphics pixel data and the overlay pixel data.

* * * * *